United States Patent
Arie et al.

(10) Patent No.: US 8,451,529 B2
(45) Date of Patent: May 28, 2013

(54) METHOD AND SYSTEM FOR OPTICAL CONVERSION

(75) Inventors: Ady Arie, Herzeliya (IL); Zachary Sacks, Modiin (IL); Ofer Gayer, Kfar Yedidya (IL); Gil Porat, Tel-Aviv (IL)

(73) Assignees: Elbit Systems Electro-Optics Elop Ltd., Rehovot (IL); Ramot at Tel Aviv University Ltd., Tel Aviv (IL)

( * ) Notice: Subject to any disclaimer, the term of this patent is extended or adjusted under 35 U.S.C. 154(b) by 0 days.

(21) Appl. No.: 13/389,032

(22) PCT Filed: Aug. 5, 2010

(86) PCT No.: PCT/US2010/044481
§ 371 (c)(1),
(2), (4) Date: Feb. 6, 2012

(87) PCT Pub. No.: WO2011/017478
PCT Pub. Date: Feb. 10, 2011

(65) Prior Publication Data
US 2012/0134013 A1 May 31, 2012

Related U.S. Application Data

(60) Provisional application No. 61/231,691, filed on Aug. 6, 2009.

(51) Int. Cl.
*G02F 1/39* (2006.01)

(52) U.S. Cl.
USPC .............................. 359/330; 385/122; 372/22

(58) Field of Classification Search
USPC ................ 359/326–332; 385/122; 372/21–22
See application file for complete search history.

(56) References Cited

U.S. PATENT DOCUMENTS

| | | | | |
|---|---|---|---|---|
| 5,815,307 A | * | 9/1998 | Arbore et al. | 359/328 |
| 6,016,214 A | * | 1/2000 | Meyer et al. | 359/237 |
| 6,101,023 A | * | 8/2000 | Meyer et al. | 359/330 |
| 6,710,914 B2 | * | 3/2004 | Arbore et al. | 359/330 |
| 7,009,759 B2 | * | 3/2006 | Chou et al. | 359/326 |
| 7,265,897 B2 | * | 9/2007 | Miller et al. | 359/326 |
| 2005/0280886 A1 | | 12/2005 | Chou et al. | |

FOREIGN PATENT DOCUMENTS

| | | |
|---|---|---|
| JP | 2006114642 | 4/2006 |
| JP | 2006114642 A * | 4/2006 |

OTHER PUBLICATIONS

International Search Report and Written Opinion issued for the corresponding PCT application No. PCT/US10/44481, dated Apr. 18, 2011.

* cited by examiner

*Primary Examiner* — Daniel Petkovsek
(74) *Attorney, Agent, or Firm* — Pearl Cohen Zedek Latzer, LLP

(57) ABSTRACT

A cA crystal configured to change a frequency of a laser through an optical parametric oscillation (OPO) process and a difference frequency generation (DFG) process is provided. The crystal includes: an OPO-DFG segment that is quasi-periodically poled to yield (i) a conversion of a laser pump light applied thereto, to a first signal and an idler, and (ii) a conversion of a first signal applied thereto, to a second signal and to the idler, by phase-matching a difference frequency generation (DFG) process and an OPO process therein simultaneously, wherein the laser pump light has a frequency that equals a sum of a frequency of the first signal and a frequency of the idler and wherein the frequency of the first signal equals a sum of a frequency of the second signal and the frequency of the idler.

17 Claims, 7 Drawing Sheets

METHOD AND SYSTEM FOR OPTICAL CONVERSION

CROSS REFERENCE TO RELATED APPLICATIONS

This application is a National Phase Application of PCT International Application No. PCT/US2010/044481, International Filing Date Aug. 5, 2010, claiming priority of Provisional Patent Application No. 61/231,691, filed Aug. 6, 2009.

BACKGROUND

1. Technical Field

The present invention relates to a system and method for optical conversion and especially for performing optical parametric oscillation and difference frequency generation.

2. Discussion of the Related Art

Nonlinear difference frequency processes, such as optical parametric oscillation, optical parametric amplification and optical parametric generation are used to generate longer wavelengths from a shorter wavelength via a process called difference frequency generation (DFG) using a nonlinear crystal. In optical parametric oscillation for example, the crystal converts the pump wavelength (i.e., the input wavelength) into two longer wavelengths—the signal and the idler. The nonlinear conversion generally requires high intensities of light, and, as such, the crystal may be placed inside a cavity to enhance the electric field of some or all of the wavelengths involved. The cavity can resonate one, two, or three wavelengths to increase the electric field of the light inside the cavity. Such a device in which light is resonated to convert longer wavelengths is called an optical parametric oscillator (OPO). Without the resonating cavity, this device is called an optical parametric amplifier (OPA) or an optical parametric generator (OPG).

Efficient infrared optical sources are required for various fields of research, including time resolved spectroscopy, absorption spectroscopy, photochemistry and environmental sensing. Tunable infrared radiation is commonly provided by an optical parametric oscillator (OPO) pumped by a laser of frequency $\omega_p$, generating signal frequency $\omega_s$ and idler frequency $\omega_i$ satisfying $\omega_p = \omega_s + \omega_i$. The quantum efficiency of the frequency down conversion process of the laser light to longer wavelengths poses a limit to the overall efficiency of the OPO. For example, the quantum efficiency of converting $\lambda_p = 1$ µm to $\lambda_i = 4$ µm is $\eta_q = \lambda_p/\lambda_i = 25\%$.

Generally, the light-to-light conversion efficiency of an OPO is approximately one-half of the quantum limit. For example, if a 1 µm to a 4 µm conversion is desired, the expected efficiency would be about $0.5*1$ µm/4 µm, or 12.5%. Reported values are typically around 10%, probably due to additional absorption in typical crystals used for this conversion.

Other approaches to improving OPO efficiency have included 1) improvement of the crystal quality, minimizing absorption. and maximizing the nonlinear gain in the case of periodically poled materials; 2) use of an OPA after the OPO to convert a portion of the remaining pump light to the desired wavelength; 3) modification of the OPO cavity either by using multiple crystals or by optimization of the mirror reflectivities and curvatures; 4) design of the OPO to include multiple conversion processes to obtain the desired wavelength at higher powers.

Efficiency enhancement as well as generation of additional wavelengths has been theoretically and experimentally demonstrated by phase-matching an additional cascaded frequency conversion processes in the same cavity.

Efficiency enhancement is obtained by using the signal wave of one process to pump an additional process which generates energy at the first process's signal or idler frequency. This is done by using multiple crystals or poling separate zones of the same crystal with different periods.

Simultaneous phase-matching of cascaded processes in an OPO cavity has also been demonstrated experimentally however not for the purpose of enhancing the OPO efficiency.

There is thus a need for a system and method for increasing difference frequency generator efficiency while maintaining the architecture of the difference frequency generator.

BRIEF SUMMARY

One aspect of the invention provides a crystal configured to convert a frequency of a laser signal through an optical parametric oscillation (OPO) process and a difference frequency generation (DFG) process. The crystal may include an OPO/DFG segment that is quasi-periodically poled to yield (i) a conversion of a pump applied thereto, to the first signal and an idler (ii) a conversion of a first signal applied thereto, to a second signal and to an idler, by phase-matching a difference frequency generation (DFG) process and an OPO process therein, wherein the pump has a frequency that equals a sum of a frequency of the first signal and a frequency of the idler and wherein the frequency of the first signal equals a sum of a frequency of the second signal and the frequency of the idler.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

Figure 1:
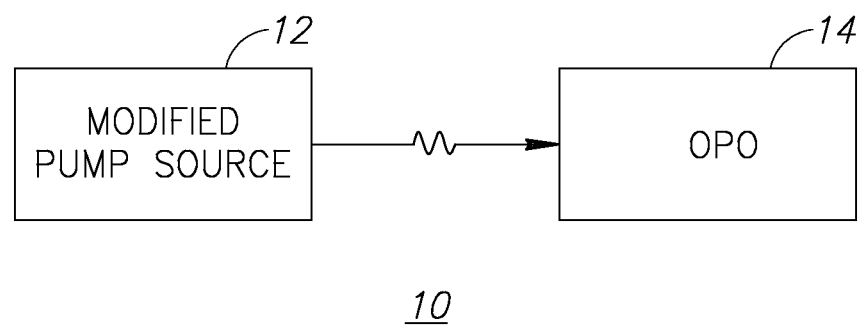
FIG. 1 is a block diagram illustration of a system for increasing efficiency of an OPO, in accordance with embodiments of the present invention.

It will be appreciated that for simplicity and clarity of illustration, elements shown in the drawings have not-necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. Moreover, some of the blocks depicted in the drawings may be combined into a single function. The drawings together with the following detailed description make apparent to those skilled in the art how the invention may be embodied in practice.

DETAILED DESCRIPTION

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The present invention employs the scheme of quasi-phase-matching in the same crystal location to perform two simultaneous processes: in addition to the OPO process, a difference frequency generation (DFG) process which converts signal energy into idler energy, and an additional frequency named signal2, satisfying $\omega_s = \omega_{s2} + \omega_i$.

The OPO process and the DFG process can take place separately at different zones of the crystal or they can occur simultaneously at the same zone, by using a quasi-periodic design which supports both processes. Thus the crystal is generally composed of three segments: the first is periodically poled to phase-match the OPO processes, the second is quasi-periodically poled to simultaneously phase-match both OPO and DFG process, and the third is periodically poled to phase-match the DFG process. The order of the segments follows a cascade logic: (a) the first segment converts pump frequency to a first frequency and an idler frequency; (b) the second segment performs two conversions: (i) pump frequency to a first frequency and an idler frequency conversion and (ii) first frequency to second frequency and idler frequency; (c) the third segment converts first frequency to second frequency and idler.

Each segment may perform a conversion on signals provided to it from a preceding segment. The conversion can be applied on residual signals such as a residual pump signal that is outputted from the first segment, and the like.

This configuration allows both processes to enjoy extended and overlapping interaction lengths. Degenerate cases can be also implemented, in which the crystal is composed of only one or two of the three segment types. This cascading of periodically and quasi-periodically quasi-phasematched processes requires additional phase-matching between waves generated in different parts of the crystal, which is obtained via poling a short part of the crystal without modulation. This short segment of constant poling is termed 'stub'.

Employing the slowly varying envelope approximation as to obtain the following coupled wave equations for all four interacting waves, where the OPO signal functions as the DFG pump and the OPO idler is also the DFG idler:

$$dA_p/dz = -(\alpha_p/2)A_p(z) + \kappa_{OPO,p}(z)A_s(z)A_i(z)\exp(-i\Delta\kappa_{OPO}z)$$

$$dA_s/dz = -(\alpha_s/2)A_s(z) + \kappa_{OPO,s}(z)A_p(z)A^*_i(z)\exp(-i\Delta\kappa_{OPO}z) + K_{DFG,s}(z)A_{s2}(z)A_i(z)\exp(-i\Delta k_{DFG}z)$$

$$dA_i/dz = -(\alpha_i/2)A_s(z) + \kappa_{OPO,i}(z)A_p(z)A^*_s(z)\exp(-i\Delta\kappa_{OPO}z) + K_{DFG,i}(z)A_s(Z)A^*_{s2}(Z)\exp(-i\Delta k_{DFG}z)$$

$$dA_{s2}/dz = -(\alpha_{s2}/2)A_p(z) + \kappa_{DFG,s2}(z)A_s(z)A^*_i(z)\exp(-i\Delta\kappa_{DFG}z)$$

$$\Delta k_{OPO} = k_p - k_i - k_s$$

$$\Delta k_{DFG} = k_s - k_i - k_{s2}$$

The indices p, s and i indicate the OPO process's pump, signal and idler respectively. The index s2 indicates the DFG process's signal, named 'signal2'. $A_j$, $\alpha_j$, $\omega_j$ and $k_j$ are the amplitude, power attenuation per unit length, wavelength and wave number of wave j, respectively.

$K_{OPO,j}(z) = i\omega_j d_{OPO} g(z)/cn_j$ and $K_{DFG,j}(z) = i\omega_j d_{DFG} g(z)/cn_j$ are the OPO and DFG process coupling coefficients for wave j, respectively. g(z) is a unit-less modulation function of the nonlinear coefficient $\chi^{(2)}$, $d_{OPO} = \frac{1}{2}\chi^{(2)}_{OPO}$ and $d_{DFG} = \frac{1}{2}\chi^{(2)}_{DFG}$ are the OPO and DFG nonlinear coefficients, respectively, calculated using Miller's rule:

$$d_{OPO} = (n_i^2 - 1)(n_p^2 - 1)(n_s^2 - 1)/([n^2(532\text{ nm}) - 1][n^2(1064\text{ nm}) - 1]^2) \cdot d_{33,SHG}(532\text{ nm}, 1064\text{ nm}, 1064\text{ nm})$$

$$d_{DFG} = (n_i^2 - 1)(n_s^2 - 1)(n_{s2}^2 - 1)/([n^2(532\text{ nm}) - 1][n^2(1064\text{ nm}) - 1]^2) \cdot d_{33,SHG}(532\text{ nm}, 1064\text{ nm}, 1064\text{ nm})$$

$$d_{33,SHG}(532\text{ nm}, 1064\text{ nm}, 1064\text{ nm}) = 25\text{ pm/V}$$

Since the refraction index is temperature dependent, the modulation of $\chi^{(2)}$ must provide quasi-phase-matching of both processes at the same temperature, such that the idler frequencies will indeed coincide.

A numerical simulation can demonstrate the beneficial effect of this scheme on pump to idler conversion efficiency, by applying the split step Fourier method and taking into account beam diffraction. The simulation investigates an OPO system based on a 40 mm long 5% MgO-doped congruently grown LiNb03 (MgC LN) crystal, placed in a 55 mm long linear cavity with two mirrors of radius of curvature=50 mm. The OPO is single-pass singly resonant, i.e. the output coupling mirror partially reflects the signal beam only. The pump, signal, signal2 and idler wavelengths are $\lambda p = 1.064$ μm, $\lambda s = 1.456$ μm, $\lambda_{s2} = 2.307$ μm, $\lambda_i = 3.950$ μm, having the corresponding absorption rates $\alpha_p = \alpha_s = \alpha_{s2} = 0.001$ cm−1, $\alpha_i = 0.08$ cm−1, the idler frequency being near the edge of LiNbO3's transparency range. Pump pulse energy was 150 μJ. Optimization can be conducted with respect to idler conversion efficiency. For these wavelengths $d_{opo} = 20.03$ pm/V and $d_{dfg} 19.15$ pm/V. Sellmeier equation can be used in order to account for the wavelength and temperature dependence of MgCLN refraction index. Designing the system to work at a temperature of 125° C. results in periods of 28.83 μm and 32.82 μm in order to periodically quasi-phase-match the OPO and DFG process, respectively.

Reference is now made to FIG. 1, which is a block diagram illustration of a system 10 for increasing efficiency of an OPO, in accordance with embodiments of the present invention. Generally, an OPO is pumped by an existing, unmodified pulse from a source. In the present invention, a modification of the pump pulse via tailored parameters to optimize OPO 14 is provided. System 10 includes a single modified pump source 12 and an OPO 14. Modified pump source 12 may be any source which can be modified, either externally or internally, and which may be suitable for producing a pulsed or continuous wave radiation, such as a bulk laser, fiber laser, hybrid laser, or diode. The modified source pulse is sent directly to OPO 14. In general, modulation of the pulse to the desired shape is generally performed at low power in order to use the laser power efficiently and since technologies for arbitrary pulse shaping are more straightforward at lower powers. One objective of modifying the pulse shape is to decrease the buildup time and maximize the steady state conversion. Another objective may be to specifically shape the pump pulse to achieve the desired output pulse for a specific application. Such control of the pump pulse may be used to arbitrarily modulate the output pulse.

Figure 2:
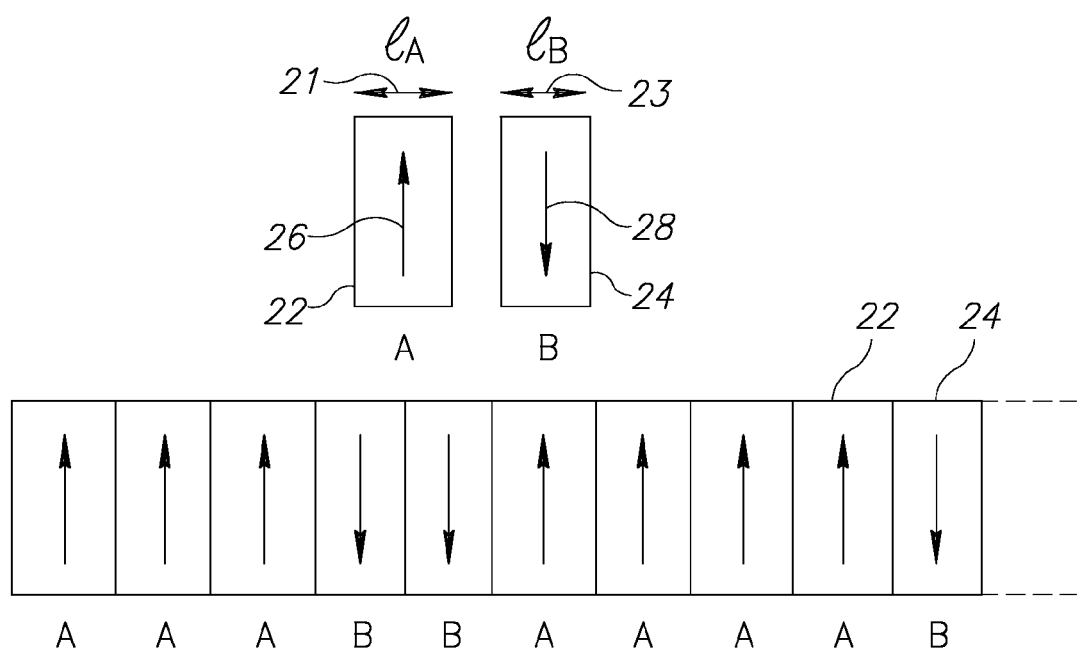
FIG. 2 illustrates a quasi-periodic lattice according to an embodiment of the present invention.

FIG. 2 illustrates a quasi-periodic lattice composed of oppositely polarized building blocks A and B, denoted 22 and 24 respectively. The quasi-periodic segment of the crystal can be designed using the Dual Grid Method (DGM).

The quasi-periodic lattice is composed of two basic building blocks 22 and 24, with lengths $l_a$ (denoted 21) and $l_b$ (denoted 23). In this example: $l_a$ 5=16.27 µm and $l_b$=14.30 µm. Each of the block types, 22 and 24, is oppositely polarized (illustrated by arrows 26 and 28) via electric-field poling.

Figure 3:
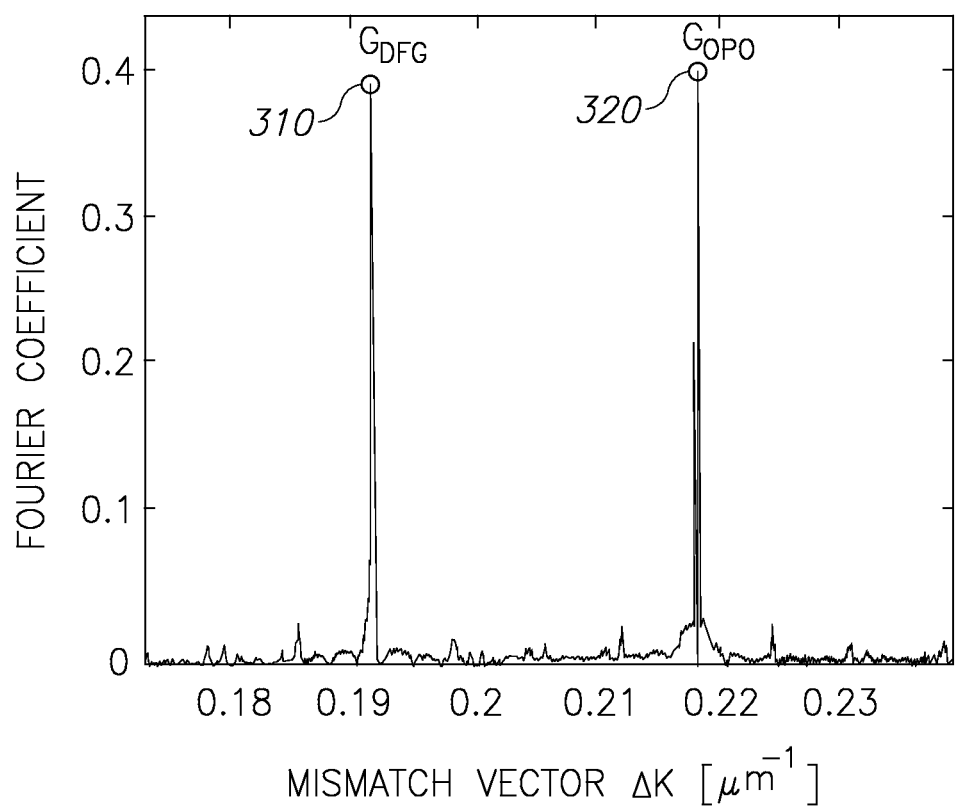
FIG. 3 is a graph illustrating a Fourier transform of the quasi-periodic lattice.

FIG. 3 illustrates a Fourier transform of the quasi-periodic lattice, which shows that first order Fourier coefficients of g(z) are $G_{opo}$ (320)=0.3996 and $G_{DFG}$ (310)=0.3994. For comparison, the highest Fourier coefficient in case of a periodic modulation is $2/\pi \approx 0.63$.

The DGM (Dual Grid Method) algorithm requires shifting of the quasi-periodic lattice in relation to its origin, which produces a phase shift of the effective nonlinear coefficients. This phase shift causes the signal and idler waves generated in the quasi-periodic segment of the crystal to be out of phase with the signal and idler waves generated in the preceding periodic segment of the crystal. As mentioned above, this phase shift is compensated by a stub—a length of constant polarization—which is placed before the quasi-periodic segment.

The purpose of the stub is that the signal and idler waves accumulate the required compensating phase along the stub, so they enter the quasi-periodically poled segment phase-matched to the signal and idler waves produced in that segment. However, these waves accumulate phase at different rates not only because of their different frequencies, but also as a result of their different dependence on the phase-mismatch of each process.

Therefore there is no single stub length which perfectly phase-matches both wave pairs. The optimal stub length, defined as the length yielding the highest output idler energy, is not necessarily the one which phase matches the two idler waves, since the signal wave acts as a pump to the DFG process which produces higher idler energy.

Figure 4:
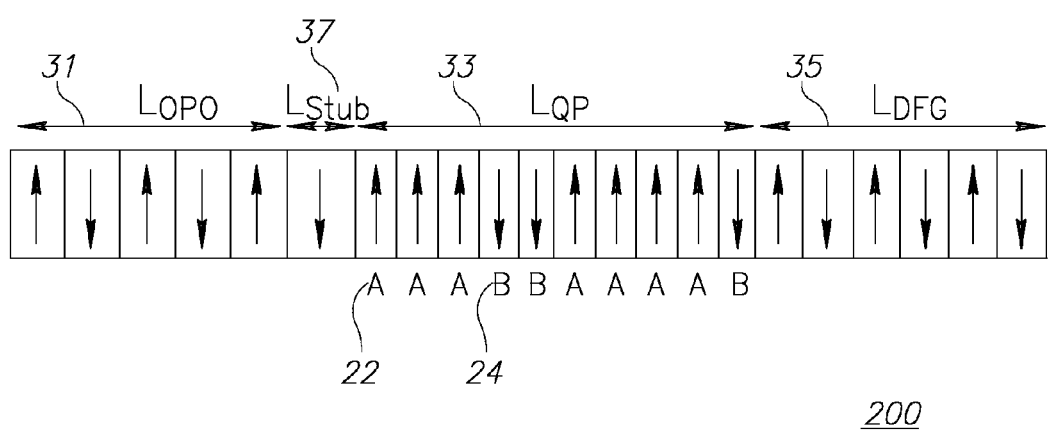
FIG. 4 illustrates a general case of crystal grating.

FIG. 4 illustrates a general case of crystal grating which includes all three modulation types and the stub. The three segment lengths and stub length are optimized by the simulation for several possible combinations of the periodically and quasi-periodically poled segments.

$L_{opo}$ 31 is the length of the first segment, which is periodically poled to quasi-phase-match the OPO process. $L_{stub}$ 37 is the length of the stub, placed between the first periodic segment and the quasi-periodic segment. $L_{op}$ 33 is the length of the quasi-periodic segment. $L_{DFG}$ 35 is the length of the periodic segment which quasi-phase-matches the DFG process.

Simulation results for a Gaussian pump pulse with duration $T_p$=5.5 ns and signal reflection of $R_s$=90% for the output coupler mirror are summarized in Table 1 below.

Figure 5A:
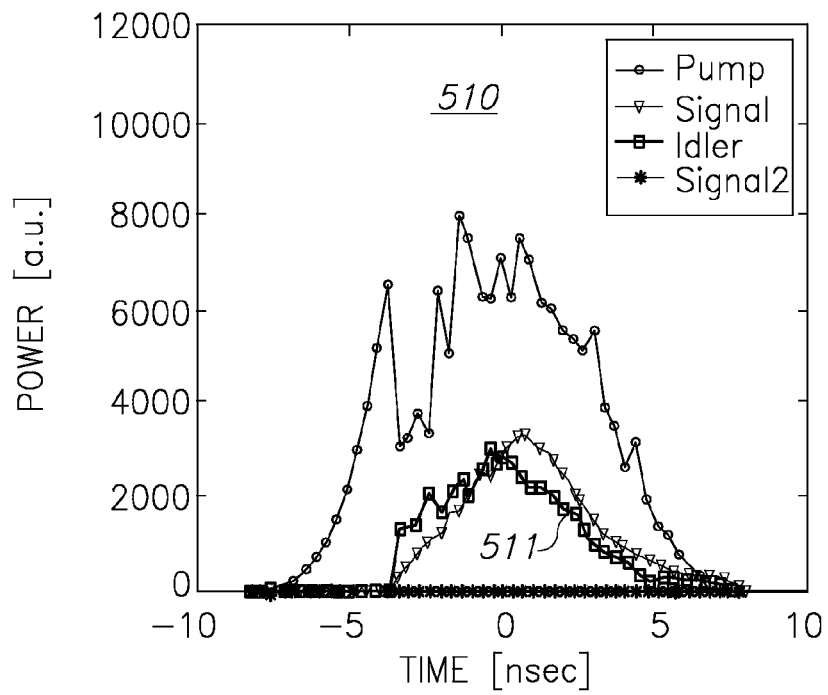
FIGS. 5A and 5B are simulated graphical illustrations of OPO output with a standard Gaussian pulse input.
Figure 5B:
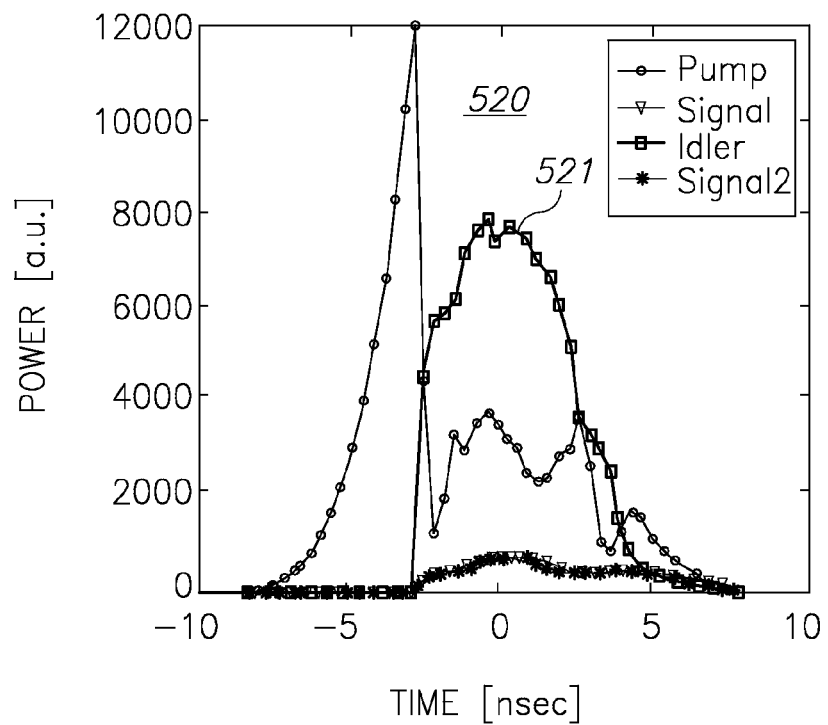

FIGS. 5A and 5B illustrate the power vs. time for each of the four output waves, where FIG. 5A is a periodic OPO configuration and FIG. 5B is an optimal OPO-QP-DFG configuration, i.e., the one with maximum idler conversion. Pump depletion begins at a later part of the pulse, i.e., when pump power is higher, for the optimal OPO-QP-DFG. This is an indication of OPO gain reduction which results from shorter interaction length of the OPO process as compared with the periodic OPO configuration. However, for the remainder of the pulse duration, the pump remains further depleted in the OPO-QP-DFG configuration. This can be an indication of lower back-conversion, resulting from depletion of the resonant signal. An additional byproduct of the DFG process is efficient pump to signal2 conversion. The additional generated wave signal2 may also be of practical use for an application requiring two infrared frequencies. The above is well illustrated in graphs 510 and 520 where the signal is indicated as 511 and 521 respectively.

TABLE 1

Simulation results

| Configuration name and optimal lengths | Pump (1.064 µm) | Signal (1.45 µm) | Signal2 (2.3 µm) | Idler (3.95 µm) |
|---|---|---|---|---|
| OPO $L_{opo} = L_{tot}$ | 54(36%) | 16.7(11.1%) | 0(0) | 14.7(9.8%) |
| QP $L_{qp} = L_{tot}$ | 63.3(42%) | 5.8(3.9%) | 25(16.7%) | 28.4(18.9%) |
| OPO-DFG $L_{opo} = 0.78L_{tot}$ $L_{dfg} = 0.22L_{tot}$ | 56.7(38.4%) | 5.2(3.5%) | 30.6(20.4%) | 31(20.7%) |
| OPO-QP $L_{opo} = 0.70L_{tot}$ $L_{dqp} = 0.30L_{tot}$ | 42.7(28.5%) | 8.41(5.6%) | 29.8(19.9%) | 34.5(23%) |
| QP-DFG $L_{qp} = 0.90Ltot$ $L_{dfg} = 0.10Ltot$ | 62(41.3%) | 3(2%) | 32(21.3%) | 33.2(22.1%) |
| OPO-QP-DFG $L_{opo} = 0.70Ltot$ $L_{qp} = 0.10Ltot$ $L_{dfg} = 0.20Ltot$ | 38.9(25.9%) | 4.4(2.9%) | 38.2(25.5%) | 39.5(26.3%) |

The table shows simulation results for the optimized lengths of each configuration. lengths are expressed as relative part of the total crystal length, Ltot=40 mm Table values for each wavelength are output power [µJ] (output power relative to pump input power [%]). Stub lengths for the configurations with .quasi-periodic poling following periodic poling (rows 4 and 6) are 5 µm and 21 µm, respectively.

Simulation results indicate a significant improvement of pump to idler conversion efficiency due to the presence of the DFG process, increasing from 9.8% in a straightforward OPO to 20.7% in the OPO-DFG configuration. Further improvement is obtained when the periodically poled segment is followed by the quasi-periodic segment, increasing idler efficiency to 23% and 26.3% in the OPO-QP and OPO-QP-DFG configurations, respectively. This is also true for pump to signal2 conversion efficiency, reaching 25.5% in the OPO-QP-DFG configuration. The conclusion is that large signal build-up in the first periodic segment, augmented by additional signal generation in the quasi-periodic segment, is crucial for the effectiveness of the DFG process and thus to the overall pump to idler conversion efficiency.

This conclusion also agrees with the optimal lengths of the first periodic segment being at least 70% of the total crystal length.

Figure 6:
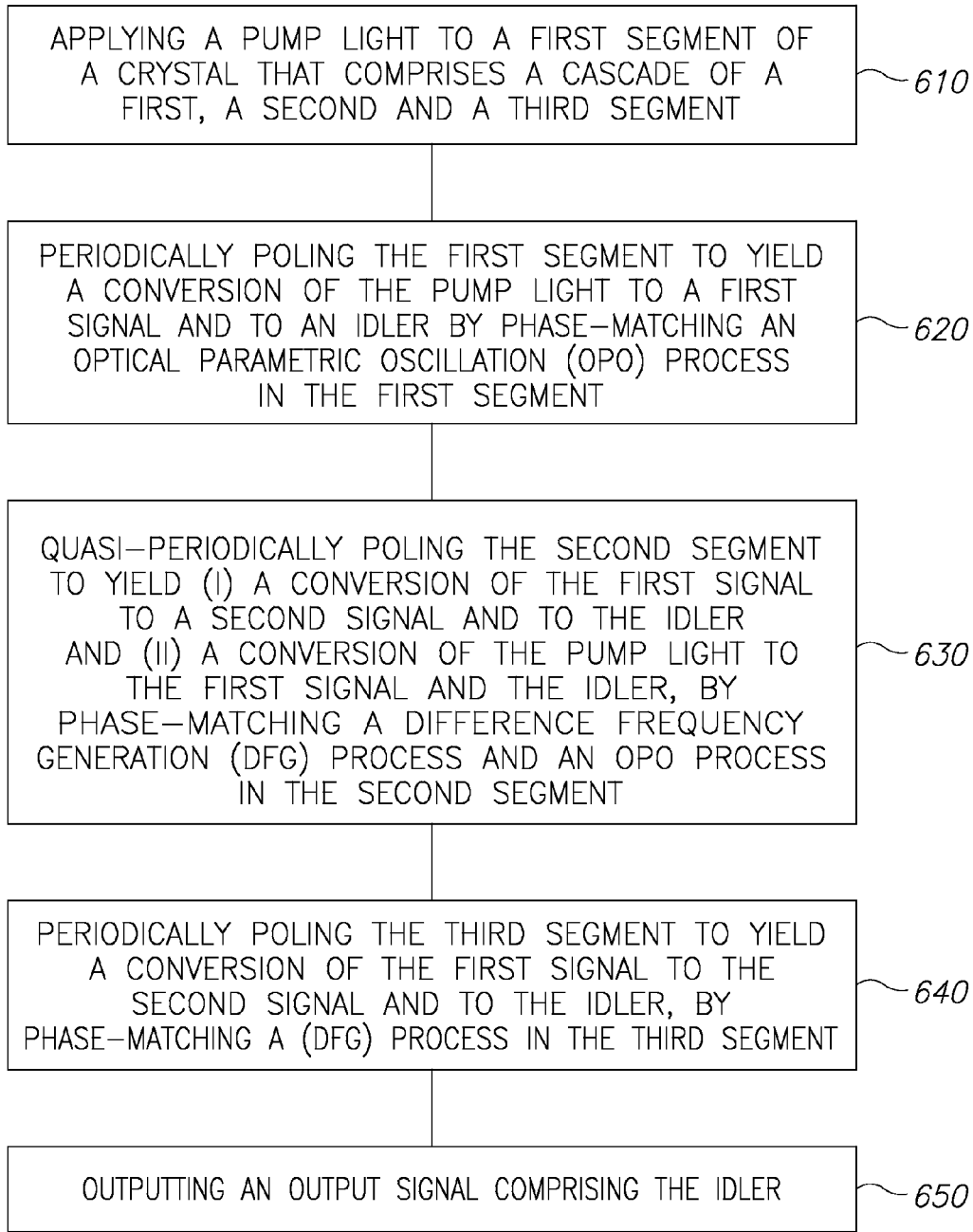
FIG. 6 illustrates a flowchart of a method for changing a wavelength of a laser.

The simulations show that a significant increase of 168% in conversion efficiency is expected with this method. Increasing OPO efficiency by (non-simultaneously) phase-matching an additional cascaded interactivity DFG process has been demonstrated. It is expected that by simultaneously phase-matching both processes, the further improvement of OPO conversion efficiency can be demonstrated experimentally. FIG. 6 illustrates method 600 for changing a frequency of a laser. Method 600 may include all or some of the following stages: applying a pump light to a first segment of a crystal that comprises a cascade of a first, a second and a third segment 610; periodically poling the first segment to yield a conversion of the pump light to a first signal and to an idler by phase-matching an optical parametric oscillation (OPO) process in the first segment 620; quasi-periodically poling the second segment to yield (i) a conversion of the first signal to a second signal and to the idler and (ii) a conversion of the pump light to the first signal and the idler, by phase-matching a difference frequency generation (DFG) process and an OPO process in the second segment 630; periodically poling the third segment to yield a conversion of the first signal to the second signal and to the idler, by phase-matching a (DFG) process in the third segment 640; and outputting an output signal comprising the idler.

Figure 7:
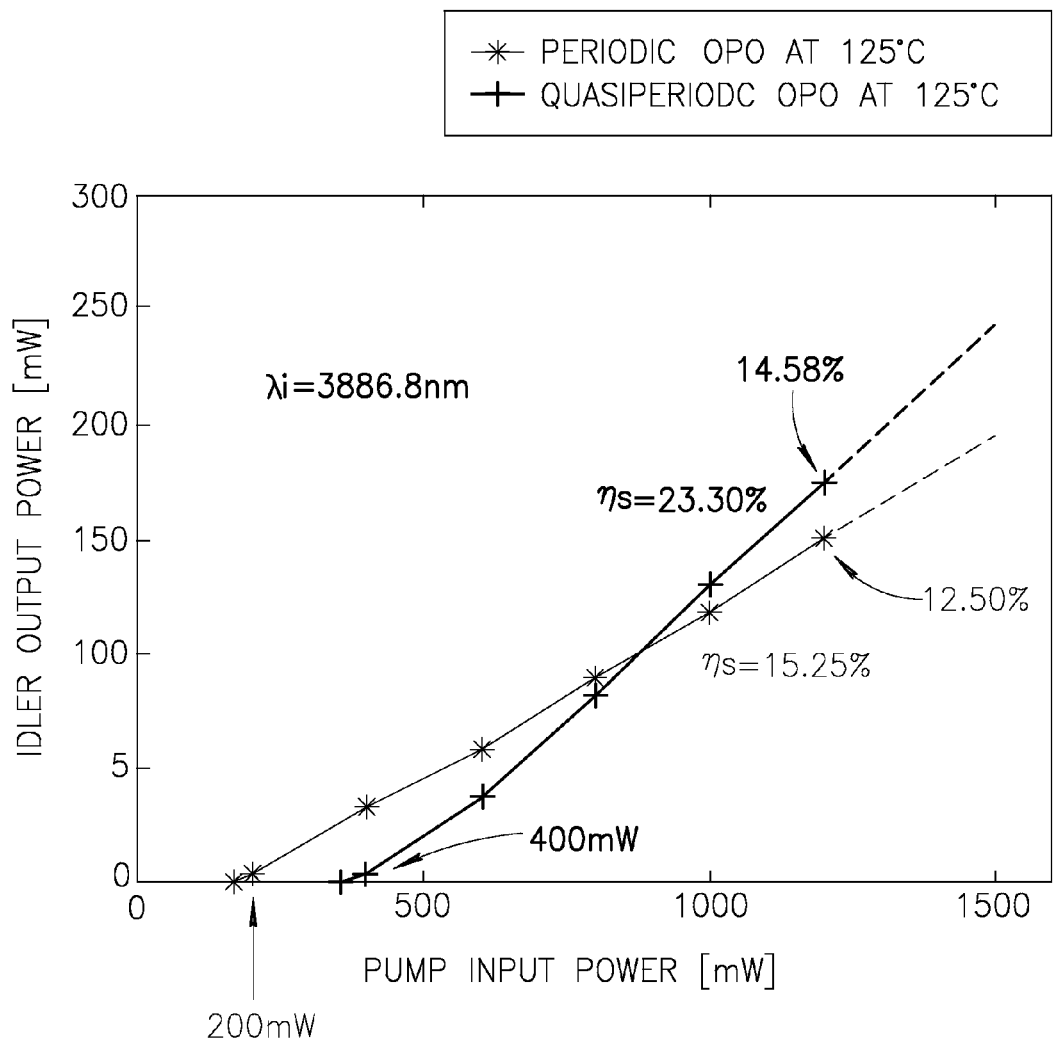
FIG. 7 is a graph of experimental results according to an aspect of the present invention.

FIG. 7 is a graph of experimental results, showing the improvement in using a quasi-periodic crystal that supports both the OPO and DFG processes, with respect to a standard periodic OPO. In the experimentation, The 40 mm nonlinear crystal (Mg-dopled congruent lithium niobate) included one stripe with a quasi-periodic modulation (for matching two processes, pump->signal and idler, signal->signal2 and idler) of the nonlinear coefficient and another parallel stripe with periodic modulation for a single process (pump->signal and idler). Pump, signal signal2 and idler wavelengths were 1064.5, 1456, 2307, and 3950 nm respectively. The crystal was placed in a 55-mm-long linear cavity made of two mirrors with a 50 mm radius of curvature, pumped by a 5.5 ns Nd:YAG laser with a repetition rate of 10 kHz. The OPO is single-pass singly resonant; i.e., the output coupling mirror partially reflects the signal beam only. As may be seen in FIG. 7, the conversion efficiency for Ppump=1.2 W is improved by 16.6% and further, the slope efficiency improved by 52.8%.

While certain features of the present invention have been illustrated and described herein, many modifications, substitutions, changes, and equivalents may occur to those of ordinary skill in the art. It is, therefore, to be understood that the appended claims are intended to cover all such modifications and changes as fall within the true spirit of the present invention.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention.

What is claimed is:

1. A crystal configured to change a frequency of a laser through an optical parametric oscillation (OPO) process and a difference frequency generation (DFG) process, the crystal comprising:
    an OPO-DFG segment that is quasi-periodically poled to yield:
        (i) a conversion of a laser pump light applied thereto, to a first signal and an idler; and
        (ii) a conversion of a first signal applied thereto, to a second signal and to the idler, by phase-matching the difference frequency generation (DFG) process and the OPO process therein simultaneously,
    wherein the laser pump light has a frequency that equals a sum of a frequency of the first signal and a frequency of the idler, and
    wherein the frequency of the first signal equals a sum of a frequency of the second signal and the frequency of the idler.

2. The crystal according to claim 1, further comprising at least one of: (i) an OPO segment that is periodically poled to yield the conversion of the laser pump light applied thereto, to the first signal and to the idler, by phase-matching the OPO process; and (ii) a DFG segment that is periodically poled to yield the conversion of the first signal to the second signal and to the idler, by phase-matching the DFG process, wherein the OPO-DFG segment and at least one of the OPO segment and the DFG segment are in a cascade configuration.

3. The crystal according to claim 2, further comprising a phase matching segment located between the OPO segment and the OPO-DFG segment and configured to phase match signals outputted from the OPO segment to the OPO-DFG segment.

4. The crystal according to claim 2, wherein a length of the OPO-DFG segment is at least eight times of a length of the DFG segment.

5. The crystal according to claim 2, wherein a length of the OPO segment is at least twice of a length of the OPO-DFG segment.

6. The crystal according to claim 2, wherein a ratio between a length of the OPO-DFG segment and a length of the DFG segment is 3:7.

7. The crystal according to claim 2, wherein at least two of: the OPO segment, the OPO-DFG segment, and the DFG segment are located at a same zone of the crystal.

8. The crystal according to claim 2, wherein at least two of: the OPO segment, the OPO-DFG segment, and the DFG segment are located at different zones of the crystal.

9. The crystal according to claim 2, wherein a length of the OPO segment is at least twice of a sum of a length of the OPO-DFG segment and a length of the DFG segment.

10. The system according to claim 1, wherein the OPO-DFG segment is designed by applying a dual grid method.

11. A method of changing a frequency of a laser signal comprising:
    quasi-periodically poling a segment of a crystal to yield a quasi-periodically poled (QPP) segment configured to (i) convert a first signal applied thereto, to a second signal and to an idler and
(ii) convert a laser pump light applied thereto, to the first signal and the idler, by simultaneously phase-matching a difference frequency generation (DFG) process and an optical parametric oscillation (OPO) process in the QPP segment,
wherein the laser pump light has a frequency that equals a sum of a frequency of the first signal and a frequency of the idler and wherein the frequency of the first signal equals a sum of a frequency of the second signal and the frequency of the idler.

12. The method according to claim 11, further comprising at least one of:
periodically poling an OPO segment to yield the conversion of the laser pump light applied thereto to the first signal and to the idler, by phase-matching the OPO process in the OPO segment; and periodically poling a DFG segment to yield the conversion of the first signal to the second signal and to the idler, by phase-matching the DFG process in the DFG segment.

13. The method according to claim 12, further comprising phase matching signals outputted from the OPO segment to the QPP segment.

14. The method according to claim 12, further comprising applying the laser pump light to the OPO segment.

15. The method according to claim 12, further comprising outputting a signal comprising the idler, from the DFG segment.

16. A crystal configured to change a frequency of a laser through an optical parametric oscillation (OPO) process and a difference frequency generation (DFG) process, the crystal comprising:
an OPO-DFG segment that is quasi-periodically poled to yield
(i) a conversion of a laser pump light applied thereto, to a first signal and an idler, and
(ii) a conversion of the first signal applied thereto, to a second signal and to the idler, by phase-matching the difference frequency generation (DFG) process and the OPO process therein simultaneously,
wherein the laser pump light has a frequency that equals a sum of a frequency of the first signal and a frequency of the idler;
wherein the frequency of the first signal equals a sum of a frequency of the second signal and the frequency of the idler;

wherein the crystal further comprises at least one of:
(i) an OPO segment that is periodically poled to yield the conversion of the laser pump light applied thereto, to the first signal and to the idler, by phase-matching the OPO process; and
(ii) a DFG segment that is periodically poled to yield the conversion of the first signal to the second signal and to the idler, by phase-matching the DFG process, wherein the OPO-DFG segment and at least one of the OPO segment and the DFG segment are in a cascade configuration; and
wherein the crystal further comprises a phase matching segment located between the OPO segment and the OPO-DFG segment and configured to phase match signals outputted from the OPO segment to the OPO-DFG segment.

17. A method of changing a frequency of a laser signal comprising:
quasi-periodically poling a segment of a crystal to yield a quasi-periodically poled (QPP) segment configured to
(i) convert a first signal applied thereto, to a second signal and to an idler; and
(ii) convert a laser pump light applied thereto, to the first signal and the idler, by simultaneously phase-matching a difference frequency generation (DFG) process and an optical parametric oscillation (OPO) process in the QPP segment,
wherein the laser pump light has a frequency that equals a sum of a frequency of the first signal and a frequency of the idler and wherein the frequency of the first signal equals a sum of a frequency of the second signal and the frequency of the idler,
wherein the method further comprises at least one of:
periodically poling an OPO segment to yield a conversion of a laser pump light applied thereto to a first signal and to an idler, by phase-matching an OPO process in the OPO segment; and
periodically poling a DFG segment to yield a conversion of the first signal to the second signal and to the idler, by phase-matching a DFG process in the DFG segment, and
wherein the method further comprises phase matching signals outputted from the OPO segment to the QPP segment.

* * * * *